United States Patent [19]
Dorbolo et al.

[11] Patent Number: 5,606,563
[45] Date of Patent: Feb. 25, 1997

[54] PROGRAMMABLE JUMP WINDOW FOR SONET COMPLIANT BIT ERROR MONITORING

[75] Inventors: Rick G. Dorbolo, Burnaby; David Wong, Vancouver; Chris E. Lee, Burnaby, all of Canada

[73] Assignee: Pmc-Sierra, Inc., Burnaby, Canada

[21] Appl. No.: 444,307

[22] Filed: May 18, 1995

[51] Int. Cl.⁶ .................................................. G06F 11/00
[52] U.S. Cl. ............................................. 371/5.1; 375/347
[58] Field of Search ................................ 371/5.1, 61, 5.2, 371/5.3, 5.5, 53, 48, 47.1, 49.1, 49.2, 67.1; 375/340, 347, 224, 225, 236; 370/94.1

[56] References Cited

U.S. PATENT DOCUMENTS

| | | | |
|---|---|---|---|
| 4,291,403 | 9/1981 | Waddill et al. ........................... | 371/5.1 |
| 4,375,102 | 2/1983 | Van Daal ................................. | 373/340 |
| 5,216,697 | 6/1993 | Ohnuki .................................... | 375/347 |
| 5,271,011 | 12/1993 | McMullan, Jr. et al. ................ | 371/53 |
| 5,436,616 | 7/1995 | Futatsugi et al. ....................... | 340/635 |

Primary Examiner—Hoa T. Nguyen
Assistant Examiner—Phung My Chung
Attorney, Agent, or Firm—Pascal & Associates

[57] ABSTRACT

A method of determining an error level of a data channel comprised of (a) receiving channel parity error data indicating when bit errors occur within a set of data carried on the channel (channel error events), successively integrating the channel error events data over successive accumulation periods, comparing the integrated channel error events data with a threshold, and indicating an alarm in the event the integrated channel error events data exceeds the threshold.

5 Claims, 1 Drawing Sheet

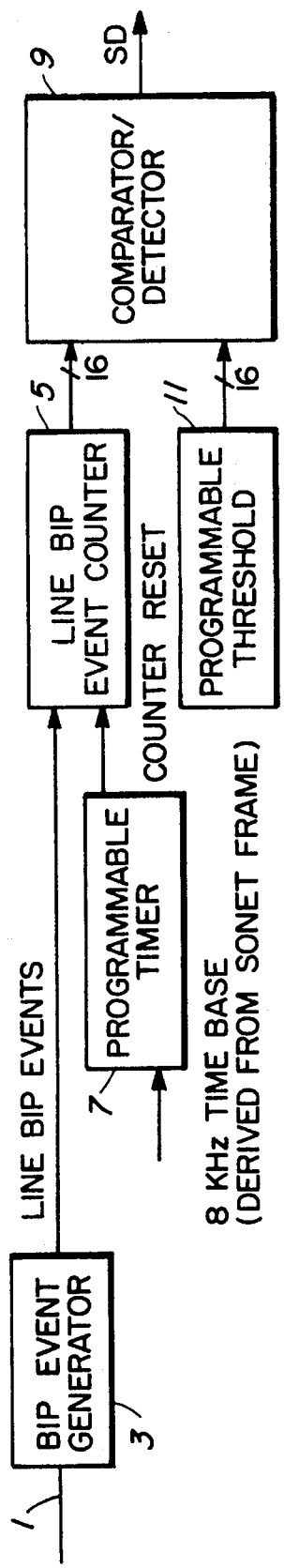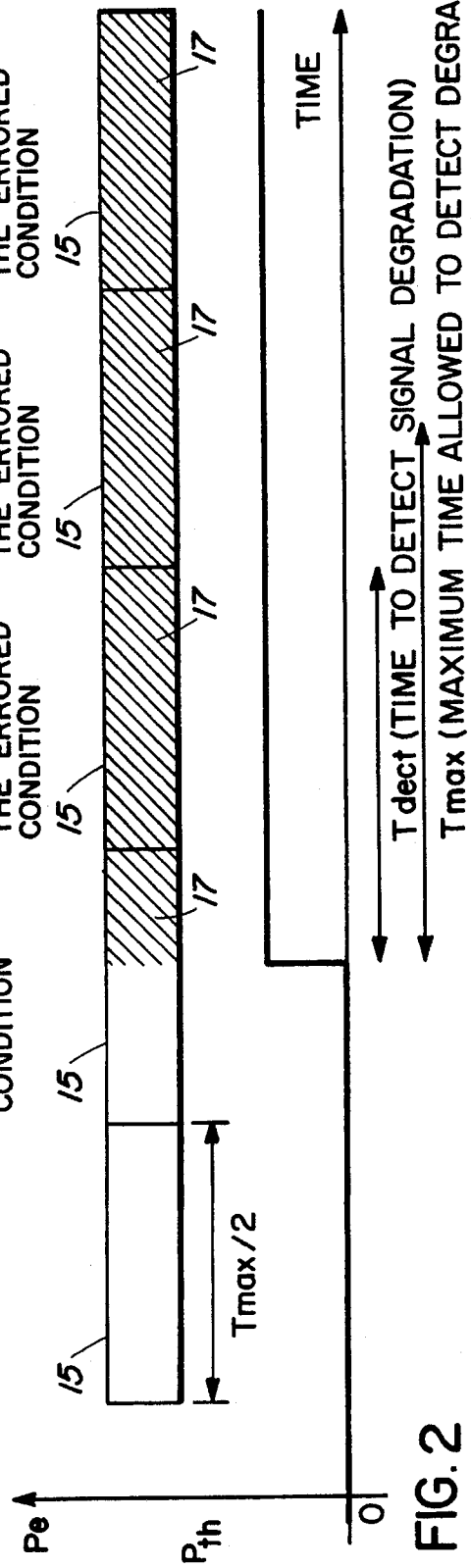

PROGRAMMABLE JUMP WINDOW FOR SONET COMPLIANT BIT ERROR MONITORING

FIELD OF THE INVENTION

This invention relates to the field of data transmission, and in particular to a method of detecting an error level of data carried by a data channel.

BACKGROUND TO THE INVENTION

In many communication systems, a channel bit error rate (BER) is used as a figure of merit. One type of communication system standard is Synchronous Optical Network (SONET), wherein a receiver, i.e. a line terminating device, must determine the channel BER quickly, and must react in the event the BER increases above defined error thresholds. Each receiver must thus be able to measure the channel BER, and indicate when the channel BER has exceeded a predetermined threshold.

In SONET systems, a sliding window is used, wherein the number of error bits received during the last N received bits is calculated, N being the window size. The number of bit errors during the window can be used to statistically estimate the channel BER. Alternatively, the number of bit errors during the window can be compared to a threshold value. If the threshold is exceeded, a BER monitoring circuit indicates that the channel BER has exceeded the threshold. This calculation is repeated for each bit received.

A significant problem exists in utilizing a sliding window. Error statistics of each bit in the window must be stored. Since the window size can get very large, it has been found to be cumbersome to implement the above in hardware.

SUMMARY OF THE INVENTION

In accordance with an embodiment of the present invention, instead of using a sliding window and directly counting the BER, the BER is monitored by integrating (accumulating) line bit-interleaved-parity (line BIP) indications over a programmable length of time. If during the integration interval the accumulated count exceeds a programmable threshold, the an alarm is raised.

In accordance with a preferred embodiment of the invention, a method of determining an error level of a data channel is comprised of receiving channel parity error data indicating when bit errors occur within a set of data carried on the channel (channel error events), successively integrating the channel error events data over successive accumulation periods, comparing the integrated channel error events data with a threshold, and indicating an alarm in the event the integrated channel error events data exceeds the threshold.

BRIEF INTRODUCTION TO THE DRAWINGS

A better understanding of the invention will be obtained by reading the description of the invention below, with reference to the following drawings, in which:

FIG. 1 is a block diagram illustrating a structure on which the present invention can be implemented, and FIG. 2 is an illustration of error vs. time, with integration intervals.

DETAILED DESCRIPTION OF THE INVENTION

In FIG. 1, data carried by a channel 1 is applied to a BIP event generator 3. The output of generator 3 is data describing line BIP events, which is applied to an input of a line BIP event counter 5, i.e. an integrator or accumulator.

A programmable timer 7, having a time base derived from the frames carried by the data channel outputs a reset signal to the counter 5.

The output of counter 5 is applied to a comparator 9, which has another input connected to the output of a programmable threshold generator.

The BIP event generator monitors the data channel, and provides an output data signal which indicates line bit-interleaved-parity (line BIP) errors. The counter 5 counts that data, i.e. the line BIP errors over an interval timed by the programmable timer 7. The integrated output of counter 5 is applied to the comparator 9, which compares the line BIP errors with a threshold determined by threshold generator 11, and generates an alarm at its SD output line when that threshold is exceeded.

The line BIP data is determined in generator 3 from the channel data bit errors as follows. A line BIP event is generated in event generator 3 when an odd number of bit errors occur within a set of data which is protected. In for example a SONET signal, there are 8*N line BIP parity bits per frame, where N is the hierarchy level of the SONET signal, and there are 8000 frames per second.

Each BIP parity bit is calculated over 801 bits, in a SONET signal. To determine the probability of a line BIP ($P_{BIP}$), the channel BER probability ($P_e$) is determined. $P_{PIB}$ is equal to the probability of an odd number of errors, wherein $$P_{BIP} = P_{1\_error} + P_{3\_errors} + P_{5\_errors} + \ldots$$

$$P_{BIP} = \binom{801}{1} P_e^1 (1 - P_e^{800}) + \binom{801}{3} P_e^3 (1 - P_e^{798}) + \binom{801}{5} P_e^5 (1 - P_e^{796}) + \ldots$$

where $$\binom{N}{K},$$

is the combination of n things k at a time. The calculated PBIP as a function of $P_e$ is given in Table 1 below:

TABLE 1

| BER | PBIP |
| --- | --- |
| $10^{-4}$ | 0.07402014 |
| $5 \times 10^{-5}$ | 0.03848983 |
| $10^{-5}$ | 0.00794626 |
| $5 \times 10^{-6}$ | 0.00398902 |
| $10^{-6}$ | 0.00080036 |
| $5 \times 10^{-7}$ | 0.00040034 |
| $10^{-7}$ | $8.0094 \times 10^{-5}$ |
| $5 \times 10^{-8}$ | $4.0048 \times 10^{-5}$ |

TABLE 1-continued

| | |
|---|---|
| $10^{-8}$ | $8.0099 \times 10^{-6}$ |
| $5 \times 10^{-9}$ | $4.005 \times 10^{-6}$ |
| $10^{-9}$ | $8.01 \times 10^{-7}$ |
| $5 \times 10^{-10}$ | $4.005 \times 10^{-7}$ |

The BIP error rate is thus generated, as a function of $P_e$.

The integration period is set by the programmable timer 7, which resets the integrating counter 5. The integration period is the period between resets. This integrating period is one half of the required detection time, in order to ensure to a high probability that the alarm will be raised within the required detection time.

For a SONET signal, the timer 7 receives an 8 KHz time base, which is derived from the SONET data frames (recalling that the SONET signal has 8000 frames per second). The timer establishes reset signals by dividing down the 8 KHz framing signal that is input to it.

FIG. 2 illustrates integration periods 15. The integration period is chosen to be one half the detection time, because the error condition may begin at any time during the first integration period. Data carrying errors is illustrated as the shaded portions 17.

As may be seen, since the first integration period containing erroneous data (the second period 15 from the left) does not completely contain the error condition, it will not likely accumulate enough errors to indicate an alarm condition. By choosing half the period as the integration time, it is guaranteed that within the required detect time, the next following integration period will contain an entire degraded signal. Enough errors would thus be accumulated to indicate the alarm condition.

The threshold signal to be output from threshold generator is preferred to be between two values $T_{MAX}$ and $T_{MIN}$, as follows:

$$T_{MAX} = (64000T_aN_0)P_{BIP} - 2.3 \sqrt{(64000T_aN_o)(P_{BIP})(1 - P_{BIP})}$$

$$T_{MIN} = (64000T_aN_o)P_{BIP/2} + 5.6 \sqrt{(64000T_aN_o)(P_{BIP/2})(1 - P_{BIP/2})}$$

It has been determined that if the threshold is set to a value greater than $T_{MAX}$, less than 99% of all alarm conditions will be detected. If the threshold is set to a value lower than $T_{MAX}$, then a greater percentage of alarm conditions will be detected, but also there will be a greater number of false alarms from channels with BERs less than the threshold. The first partly degraded integration period can be ignored, in order to have more conservative threshold values, and the average detection time will be lower than otherwise expected.

At times when the channel BER is less than the threshold BER, the number of threshold crossings should be very small. That is, the number of false signal degrade (SD) alarms should be very small. Specifically, 99% of the time, a threshold crossing should not be detected/declared within 10,000 seconds when the line error rate (BER) equals one-half the threshold error rate.

As an example, consider a threshold crossing at a BER of $10^{-4}$ with a 50 ms. integration period. In $10^4$ seconds, there will be $10^4$s./50 ms.=200,000 integration periods. It is required that during 200,000 integration periods, the probability of one more integration period not exceeding the low threshold is at most 1%. This probability PLOW is given by $$0.99 = (1 - P_{LOW})^{200000} \cong 1 - (200000)P_{LOW}$$

Solving for $P_{LOW} = 50 \times 10^{-9}$.

Similarly, for the case of a BER threshold of $10^{-6}$, $P_{LOW}$ would be approximately $50 \times 10^{-8}$. To further simplify, $P_{LOW}$ could be set to a further small value, $10^{-8}$, which is smaller than all of the other PLOW.

In order to meet a $P_{LOW}$ of $10^{-8}$, the threshold must be set to $5.6\sigma$ greater than the mean number of errors occurring at half the BER of the threshold, which is the equation indicated as $T_{MIN}$ noted above.

Threshold values and integration periods which are preferred to be used to meet SONET standards is shown in the tables below. If BERM accumulation registers are restricted to 16 bits, the BERs are restricted to the range of $10^{-4}$ to $10^{-7}$. If a larger accumulation inteveral register is used, BERs down to $10^{-9}$ can be used.

TABLE 2

SONET STANDARD STS-1

| BER | Accumulation Interval (seconds) | $T_{min}$ | $T_{max}$ |
|---|---|---|---|
| $1.0^{-04}$ | $5.00^{-02}$ | 184 | 203 |
| $1.0^{-05}$ | $5.00^{-01}$ | 190 | 218 |
| $1.0^{-06}$ | $5.00^{+00}$ | 191 | 220 |

TABLE 3

RECOMMENDED PROGRAMMING OF BERM REGISTERS FOR STS-3

| BER | Accumulation interval (seconds) | $T_{min}$ | $T_{max}$ |
|---|---|---|---|
| $1.0^{-04}$ | $1.67^{-02}$ | 184 | 203 |
| $1.0^{-05}$ | $1.67^{-01}$ | 190 | 218 |
| $1.0^{-06}$ | $1.67^{+00}$ | 191 | 220 |

TABLE 4

RECOMMENDED PROGRAMMING OF BERM REGISTERS FOR STS-12

| BER | Accumulation Interval Seconds | $T_{min}$ | $T_{max}$ |
|---|---|---|---|
| $1.0^{-04}$ | $4.17^{-03}$ | 184 | 203 |
| $1.0^{-05}$ | $4.17^{-02}$ | 190 | 218 |
| $1.0^{-06}$ | $4.17^{-01}$ | 191 | 220 |
| $1.0^{-07}$ | $4.17^{+00}$ | 191 | 220 |

A person understanding this invention may now conceive of alternative structures and embodiments or variations of the above. All of those which fall within the scope of the claims appended hereto are considered to be part of the present invention.

We claim:

1. A method of determining an error level of a data channel comprising:
   (a) receiving channel parity error data indicating when bit errors occur within a set of data carried on the channel (channel error events),
   (b) successively integrating the channel error events data over successive accumulation periods,
   (c) comparing the integrated channel error events data with a threshold, (d) indicating an alarm in the event the integrated channel error events data exceeds the threshold, and (e) said integrating step comprising integrating the detected channel error events data over accumulation periods each of which is one-half of a predetermined detection interval.

2. A method as defined in claim 1 in which each of the accumulation periods and the threshold are programmable.

3. A method as defined in claim 1 in which at least one of the accumulation periods and the threshold is fixed.

4. A method as defined in claim 2, in which the threshold is between the values $T_{MAX}$ and $T_{MIN}$, where $$T_{MAX} = (64000 T_a N_0) P_{BIP} - 2.3 \sqrt{(64000 T_a N_o)(P_{BIP})(1 - P_{BIP})}$$

-continued $$T_{MIN} = (64000 T_a N_o) P_{BIP/2} + 5.6 \sqrt{(64000 T_a N_o)(P_{BIP/2})(1 - P_{BIP/2})}$$

$P_{BIP}$ is the probability of an odd number of errors occurring, as detected using line bit interleaved parity, $T_a$ is the accumulation interval in seconds, and $N_o$ is the hierarchy level of the signal.

5. A method as defined in claim 1 including recovering line or framing pulses from the data channel and deriving a clock time base therefrom for the integration step.

\* \* \* \* \*